United States Patent
Nazarpoor et al.

(10) Patent No.: US 9,468,912 B2
(45) Date of Patent: *Oct. 18, 2016

(54) ZERO PGM CATALYST INCLUDING CU—CO—MN TERNARY SPINEL FOR TWC APPLICATIONS

(71) Applicant: Clean Diesel Technologies, Inc., Oxnard, CA (US)

(72) Inventors: Zahra Nazarpoor, Camarillo, CA (US); Oguzhan Selim Yaglidere, Moorpark, CA (US); Stephen J. Golden, Santa Barbara, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,448

(22) Filed: Nov. 17, 2014

(65) Prior Publication Data

US 2016/0136620 A1    May 19, 2016

(51) Int. Cl.
*B01J 23/889* (2006.01)
*B01J 23/10* (2006.01)
*B01J 23/00* (2006.01)
*B01D 53/94* (2006.01)

(52) U.S. Cl.
CPC .......... *B01J 23/8892* (2013.01); *B01D 53/945* (2013.01); *B01J 23/005* (2013.01); *B01J 23/10* (2013.01); *B01D 2255/207* (2013.01); *B01D 2255/2066* (2013.01); *B01D 2255/2073* (2013.01); *B01D 2255/20715* (2013.01); *B01D 2255/20746* (2013.01); *B01D 2255/20761* (2013.01); *B01D 2255/40* (2013.01); *B01D 2255/405* (2013.01)

(58) Field of Classification Search
CPC .......................... B01J 23/8892; B01J 23/005
See application file for complete search history.

(56) References Cited

U.S. PATENT DOCUMENTS

2010/0240525 A1* 9/2010 Golden ................ B01D 53/945
502/65

OTHER PUBLICATIONS

Salker et al., "Electronic and catalytic studies on Co1—xCuxMn2O4 for CO Oxidation," Journal of Materials Science 35 (2000) 4713-4719.*

* cited by examiner

*Primary Examiner* — Anthony J Zimmer
(74) *Attorney, Agent, or Firm* — Alston & Bird LLP

(57) ABSTRACT

Variations of ZPGM bulk powder catalyst materials, including Cu—Co—Mn ternary spinel systems for TWC applications are disclosed. Bulk powder catalyst samples are prepared employing a plurality of molar ratio variations, including disclosed Cu—Co—Mn spinel on Praseodymium-Zirconia support oxide made by incipient wetness method, or Cu—Co—Mn spinel on Niobium-Zirconia support oxide, which may be synthesized by co-precipitation method. A plurality of bulk powder catalyst samples may be tested by performing isothermal steady state sweep test, employing a flow reactor at inlet temperature of about 450° C., and testing a gas stream from lean to rich condition and influence on TWC performance measured/analyzed, which may lead into significant improvements in the manufacturing of ZPGM bulk powder catalyst materials for TWC applications.

9 Claims, 4 Drawing Sheets

ZERO PGM CATALYST INCLUDING CU—CO—MN TERNARY SPINEL FOR TWC APPLICATIONS

CROSS-REFERENCE TO RELATED APPLICATIONS

N/A

BACKGROUND

1. Field of the Disclosure

The present disclosure may provide Zero-PGM (ZPGM) catalyst materials, which may include stoichiometric or non-stoichiometric Cu—Co—Mn spinel in the form of powder to use for three-way catalyst (TWC) applications.

2. Background Information

TWC have utility in a number of fields including the treatment of exhaust gas streams from internal combustion engines, such as automobile, truck and other types of vehicles. Emission standards for unburned hydrocarbons, carbon monoxide and nitrogen oxide contaminants have been set by various governments and must be met by older as well as new vehicles. In order to meet such standards, catalytic converters including a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

The materials used to manufacture TWC converters may include platinum group metals (PGM), such as platinum (Pt), palladium (Pd), and rhodium (Rh), amongst others, which may provide high catalytic activity. Although these PGM catalysts may be effective for toxic emission control and have been commercialized in industry, PGM materials are expensive. This high cost remains a critical factor for wide spread applications of these type of catalysts. One possible alternative may be use of Zero-PGM catalysts, which are abundant and less expensive than PGMs.

Catalytic materials used in TWC applications may have high catalytic activities under the fluctuating exhaust gas conditions. As NOx emission standards tighten, and PGMs become scarce with small market circulation volume, constant fluctuations in price, and constant risk to stable supply, there is an increasing need for new catalyst material compositions that may not require PGM, capable to maintain efficient TWC conversion of exhaust gases.

According to the foregoing reasons, and due to environmental and economic concerns, the development of highly efficient catalyst materials is desirable. As catalysts attributes of activity, selectivity, and regenerability can be related to the physical and chemical properties of the catalyst materials, a new generation of catalyst materials may be made available for Zero-PGM catalyst systems, that can be used in a variety of environments for TWC applications, which may be cost-effectively manufactured.

SUMMARY

The present disclosure may provide Zero-PGM (ZPGM) catalysts, which may include stoichiometric or non-stoichiometric ternary spinel system of Cu—Co—Mn on a plurality of doped Zirconia support oxide in the form of powder, to develop suitable ZPGM catalysts for TWC applications.

According to an embodiment in present disclosure, bulk powder catalyst samples of ternary spinel including Cu—Co—Mn, may be prepared by taking the appropriate amount of Cu, Co and Mn precursors to obtain the right composition, then add drop-wise to doped-zirconia support oxide via incipient wetness method (IW) as known in the art. Subsequently, dry and calcine at about 800° C. for about 5 hours, followed by grinding to fine grain to make fine bulk powder catalyst samples. In present disclosure, Praseodymium-Zirconia support oxide may be used to prepare bulk powder catalyst samples, including the disclosed Cu—Co—Mn spinel system.

According to another embodiment in present disclosure, bulk powder catalyst samples including Cu—Co—Mn spinel system synthesized by co-precipitation method as known in the art. For preparation take the appropriate amount of Cu, Co, and Mn precursors to obtain the right composition, which may be mixed to doped Zirconia support oxide to make slurry. Then add appropriate amount of base solution to adjust pH of slurry for precipitation, subsequently, slurry may be filtered and washed with distilled water a few times, followed by drying, and calcine at a plurality of temperatures from about 600° C. to about 800° C. Subsequently, may be ground to fine grain, to make fine bulk powder catalyst samples. In present disclosure, Niobium-Zirconia support oxide may be used to prepare bulk powder catalyst samples including the disclosed Cu—Co—Mn ternary spinel systems.

Disclosed ternary catalyst systems including Cu—Co—Mn spinel, may be verified preparing bulk powder samples for each of the catalyst formulations and configurations, object of present disclosure, to determine its influence on TWC performance of ZPGM catalysts.

The NOx, CO, and HC conversions of bulk powder catalyst samples including the disclosed ternary spinel systems of Cu—Co—Mn on doped Zirconia support oxide may be determined and activity compared by performing isothermal steady state sweep test. The isothermal steady state sweep test may be carried out at a selected inlet temperature using an 11-point R-value from rich condition to lean condition, at a plurality of space velocities. Results from isothermal steady state sweep test may be compared to show the influence of different ternary spinel system bulk powders on TWC performance, particularly under rich condition close to stoichiometric condition at a selected R-value lower than NO/CO cross over R-value, which may be obtained from isothermal steady state sweep test condition.

According to principles in present disclosure, test results of bulk powder catalyst samples showing the most effective TWC performance may be used in the development of significant improved ZPGM catalyst systems, which may represent a new generation of ternary spinel material compositions to be made available for utilization in a plurality of environments and TWC applications, which may be cost-effectively manufactured.

Numerous other aspects, features, and benefits of the present disclosure may be made apparent from the following detailed description taken together with the drawing figures, which may illustrate the embodiments of the present disclosure, incorporated herein for reference.

BRIEF DESCRIPTION OF THE DRAWINGS

The present disclosure can be better understood by referring to the following figures. The components in the figures are not necessarily to scale, emphasis instead being place upon illustrating the principles of the disclosure. In the figures, reference numerals designate corresponding parts throughout the different views.

FIG. 1A shows comparison of HC conversion levels for bulk powder catalyst samples of Example #1. FIG. 1B illustrates comparison of $NO_x$ conversion levels for for bulk powder catalyst samples of Example #1

DETAILED DESCRIPTION

Figure 1A:
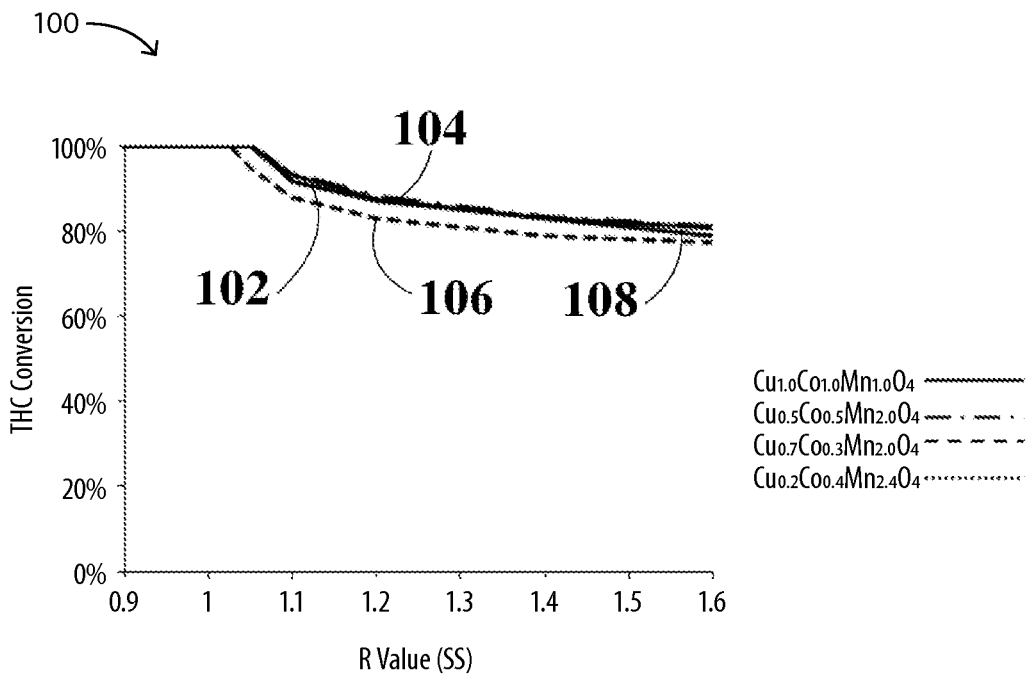
FIGS. 1A and 1B Illustrate catalyst performance comparison for bulk powder catalyst samples of Example #1, under isothermal steady state sweep condition, at inlet temperature of about 450° C. and SV of about 40,000 $h^{-1}$, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms may have the following definitions:

"Platinum group metal (PGM)" refers to platinum, palladium, ruthenium, iridium, osmium, and rhodium.

"Zero platinum group (ZPGM) catalyst" refers to a catalyst completely or substantially free of platinum group metals.

"Catalyst" refers to one or more materials that may be of use in the conversion of one or more other materials.

"Incipient wetness" refers to the process of adding solution of catalytic material to a dry support oxide powder until all pore volume of support oxide is filled out with solution and mixture goes slightly near saturation point.

"Calcination" refers to a thermal treatment process applied to solid materials, in presence of air, to bring about a thermal decomposition, phase transition, or removal of a volatile fraction at temperatures below the melting point of the solid materials.

"Treating, treated, or treatment" refers to drying, firing, heating, evaporating, calcining, or mixtures thereof.

"Spinel" refers to any of various mineral oxides of magnesium, iron, zinc, or manganese in combination with aluminum, chromium, copper or iron with $AB_2O_4$ structure.

"Conversion" refers to the chemical alteration of at least one material into one or more other materials.

"R-value" refers to the number obtained by dividing the reducing potential by the oxidizing potential of materials in a catalyst.

"Rich condition" refers to exhaust gas condition with an R-value above 1.

"Lean condition" refers to exhaust gas condition with an R-value below 1.

"Three-way catalyst (TWC)" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

DESCRIPTION OF THE DRAWINGS

The present disclosure provides a plurality of spinel bulk powder material compositions including Cu—Co—Mn spinel, prepared at different molar ratios supported on doped-Zirconia support oxide, to develop suitable ZPGM catalyst materials capable of providing improved catalytic activities. Aspects that may be treated in present disclosure, may show improvements for overall catalytic conversion capacity for a plurality of ZPGM catalysts, which may be suitable for TWC applications.

Bulk Powder ZPGM Catalyst Material Composition and Preparation

The disclosed Zero-PGM material compositions in form of bulk powder in the present disclosure may be prepared from ternary spinel of Cu—Co—Mn at different molar ratios. All ternary spinels may be supported on a plurality of support oxides, in present disclosure preferably on doped Zirconia support oxide, via incipient wetness (IW) method or via co-precipitation synthesis method.

Preparation of bulk powder catalyst samples via incipient wetness method (IW) method may begin by preparing ternary solutions of Cu—Co—Mn spinel by mixing the appropriate amount of Cu nitrate solution ($CuNO_3$), Co nitrate solution $Co(NO_3)_2$ and Mn nitrate solution ($Mn(NO_3)_2$) with water, to make solution at different molar ratios according to general formulations in Table 1, where disclosed ternary spinel systems in present disclosure are shown. Accordingly, solution of Cu, Co, and Mn nitrates may be subsequently added drop-wise to doped Zirconia support oxide powder via incipient wetness method (IW). Then, mixtures of Cu—Co—Mn ternary spinel on doped Zirconia may be dried at 120 C over night and calcined at a plurality of temperatures. In present disclosure, calcination may be performed at about 800° C. for about 5 hours. Subsequently, calcined materials of Cu—Co—Mn spinel on doped Zirconia may be ground to fine grain bulk powder.

Preparation of bulk powder catalyst samples via co-precipitation method method may begin by preparing ternary solutions of Cu—Co—Mn spinel by mixing the appropriate amount of Cu nitrate solution ($CuNO_3$), Co nitrate solution $Co(NO_3)_2$ and Mn nitrate solution ($Mn(NO_3)_2$) with water, to make solution at different molar ratios according to general formulations in Table 2, where disclosed ternary spinel systems in present disclosure are shown. Accordingly, solution of Cu, Co, and Mn nitrates may be subsequently added to doped Zirconia support oxide powder to make slurry. Then add appropriate amount of base solution to adjust pH of slurry for precipitation, subsequently, slurry may be filtered and washed with distilled water a few times, followed by drying at 120° C. over night, and calcine at a plurality of temperatures from about 600° C. to about 800° C. Subsequently, may be ground to fine grain, to make fine bulk powder catalyst samples.

In present disclosure, ternary spinel of Cu—Co—Mn at different molar ratios may be prepared employing doped ZrO2 support oxide such as $Pr_6O_{11}$—$ZrO_2$ support oxide, or $Nb_2O_5$—$ZrO_2$ support oxide.

Catalytic activity that may result from each one of disclosed ternary systems bulk powder catalyst samples may be verified by isothermal steady state sweep test and the NO/CO cross over R-value of prepared bulk powder catalyst samples may be determined and compared by performing isothermal steady state sweep test.

Isothermal Steady State Sweep Test Procedure

The isothermal steady state sweep test may be done employing a flow reactor at inlet temperature of about 450° C., and testing a gas stream at 11-point R-values from about 1.6 (rich condition) to about 0.9 (lean condition) to measure NOx, CO, and HC conversions.

The space velocity (SV) in the isothermal steady state sweep test may be adjusted at about 40,000 $h^{-1}$. The gas feed employed for the test may be a standard TWC gas composition, with variable $O_2$ concentration in order to adjust R-value from rich condition to lean condition during testing. The standard TWC gas composition may include about 8,000 ppm of CO, about 400 ppm of $C_3H_6$, about 100 ppm of $C_3H_8$, about 1,000 ppm of $NO_x$, about 2,000 ppm of $H_2$, about 10% of $CO_2$, and about 10% of $H_2O$. The quantity of $O_2$ in the gas mix may be varied to adjust Air/Fuel (A/F) ratio within the range of R-values to test the gas stream.

The following examples are intended to illustrate, but not to limit the scope of the present disclosure. It is to be understood that other procedures known to those skilled in the art may alternatively be used.

EXAMPLES

Example #1

Bulk Powder Samples of Cu—Co—Mn Spinels on Doped $ZrO_2$ Support Oxide Prepared by IW Method Example #1 may describe preparation instructions for bulk powder catalyst samples, including Cu—Co—Mn spinels with general formulation of $(Cu_xCo_y)Mn_zO_4$ spinel on Praseodymium-Zirconia support oxide, employing a plurality of molar ratio as shown in Table 1, prepared by incipient wetness method.

TABLE 1

| SPINEL COMPOSITION | SUPPORT OXIDE |
|---|---|
| $Cu_{1.0}Co_{1.0}Mn_{1.0}O_4$ | $Pr_6O_{11}$—$ZrO_2$ |
| $Cu_{0.7}Co_{0.3}Mn_{2.0}O_4$ | $Pr_6O_{11}$—$ZrO_2$ |
| $Cu_{0.5}Co_{0.5}Mn_{2.0}O_4$ | $Pr_6O_{11}$—$ZrO_2$ |
| $Cu_{0.2}Co_{0.4}Mn_{2.4}O_4$ | $Pr_6O_{11}$—$ZrO_2$ |

Preparation of bulk powder catalyst samples may begin by preparing the ternary solution for Cu—Co—Mn spinel by mixing the appropriate amount of Cu nitrate solution ($CuNO_3$), Co nitrate solution $Co(NO_3)_2$ and Mn nitrate solution ($Mn(NO_3)_2$) with water, to make solution at different molar ratios according to formulations in Table 1, where disclosed ternary spinel systems in present disclosure are shown. Accordingly, slurry of Cu, Co, and Mn nitrates may be subsequently added to $Pr_6O_{11}$—$ZrO_2$ support oxide via incipient wetness method (IW). Then, mixtures of Cu—Co—Mn ternary spinel on $Pr_6O_{11}$—$ZrO_2$ support oxide may be dried at 120 C over night and calcined at a plurality of temperatures. In present disclosure, calcination may be performed at about 800° C. for about 5 hours. Subsequently, calcined materials of Cu—Co—Mn ternary spinel on $Pr_6O_{11}$—$ZrO_2$ support oxide may be ground to fine grain bulk powder.

Example #2

Bulk Powder Samples of Cu—Co—Mn Spinels on $Nb_2O_5$—$ZrO_2$ Support Oxide Prepared by Co-Precipitation Method Example #2 may illustrate preparation of bulk powder catalyst samples from stoichiometric and non-stoichiometric Cu—Co—Mn spinels with general formulation of $(Cu_xCo_y)Mn_zO_4$ spinel supported on $Nb_2O_5$—$ZrO_2$ support oxide synthesized by co-precipitation method, employing a plurality of molar ratio, as shown in Table 2.

TABLE 2

| SPINEL COMPOSITION | SUPPORT OXIDE |
|---|---|
| $(Cu_{0.9}Co_{0.1})Mn_{2.0}O_4$ | $Nb_2O_5$—$ZrO_2$ |
| $(Cu_{0.8}Co_{0.2})Mn_{2.0}O_4$ | $Nb_2O_5$—$ZrO_2$ |
| $(Cu_{0.7}Co_{0.3})Mn_{2.0}O_4$ | $Nb_2O_5$—$ZrO_2$ |
| $(Cu_{0.2}Co_{0.4})Mn_{2.4}O_4$ | $Nb_2O_5$—$ZrO_2$ |

For preparation of bulk powder samples for each Cu—Co—Mn spinel system synthesized by co-precipitation method, a solution of corresponding spinel may be mixed with the appropriate amount of Cu nitrate, Co nitrate, and Mn nitrate. To get the right composition for each Cu—Co—Mn spinel, copper nitrate solution $Cu(NO_3)_2$, Co nitrate solution $(Co(NO_3)_2)$, and Mn nitrate solution $(Mn(NO_3)_2)$ solution may be mixed with water to make solutions according to molar ratio compositions from Table 2, where disclosed Cu—Co—Mn spinels in present disclosure are shown.

After about one hour mixing, add appropriate amount of solution to corresponding percentage of $Nb_2O_5$—$ZrO_2$ support oxide synthesized to make slurry, which may be mixed for another hour. Then, appropriate amount of one or more of sodium hydroxide (NaOH) solution, sodium carbonate ($Na_2CO_3$) solution, ammonium hydroxide ($NH_4OH$) solution, and other suitable base solution may be added to adjust pH of the slurry for precipitation. Subsequently, leave slurry overnight while stirring at room temperature.

Then, slurry may undergo filtering and washing with distilled water a few times. The resulting material may be dried overnight at about 120° C. and subsequently calcined at different temperature, including 600° C. for about 5 hours, and also at about 800° C. for about 5 hours. After calcination may be subsequently ground to a fine grain bulk powder.

Performance of Cu—Co—Mn Spinels on Pr6O11-ZrO2 Prepared by IW Method

FIG. 1, depicts performance comparison 100 for bulk powder catalyst samples of stoichiometric and non-stoichiometric Cu—Co—Mn spinel, on $Pr_6O_{11}$—$ZrO_2$ support oxide, prepared according to example #1, with molar ratios as shown in Table 1, including calcination for about 800° C. for about 5 hours, for testing under isothermal steady state sweep condition, at inlet temperature of about 450° C. and SV of about 40,000 $h^{-1}$, according to an embodiment. High conversions over a large range of R-values indicate an efficient catalyst, because it can perform well under rich (R-values>1) and lean engine conditions at (R-value<1).

FIG. 1A illustrates comparison of HC conversion levels for stoichiometric and non-stoichiometric bulk powder samples of Cu—Co—Mn spinels on $Pr_6O_{11}$—$ZrO_2$ support oxide, identified as conversion curve 102, conversion curve 104, conversion curve 106, and conversion curve 108 respectively for $Cu_{1.0}Co_{1.0}Mn_{1.0}O_4$, $Cu_{0.5}Co_{0.5}Mn_{2.0}O_4$, $Cu_{0.2}Co_{0.3}Mn_{2.0}O_4$, and $Cu_{0.2}Co_{0.4}Mn_{2.4}O_4$. As may be seen in FIG. 1A, sweep test results shows very high level of performance activity for HC conversion with 100% conversion at lean and stoichiometric condition, which slightly decreases after R-value>1.05. There is no significant difference between samples, however, $Cu_{0.2}Co_{0.3}Mn_{2.0}O_4$ shows slightly lower HC conversion under rich condition. The CO conversion (not shown here) is 100% for all samples under entire R-values.

Figure 1B:
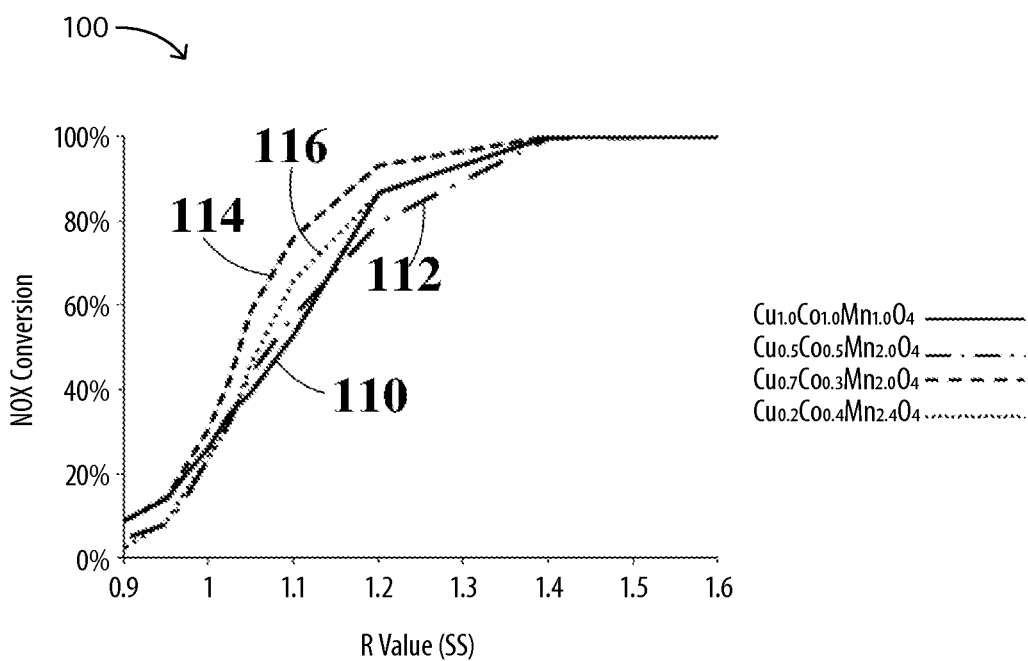

FIG. 1B illustrates comparison of $NO_x$ conversion levels for stoichiometric and non-stoichiometric bulk powder catalyst samples of Cu—Co—Mn spinels on $Pr_6O_{11}$—$ZrO_2$ support oxide, identified as conversion curve 110, conversion curve 112, conversion curve 114, and conversion curve 116 respectively for $Cu_{1.0}Co_{1.0}Mn_{1.0}O_4$, $Cu_{0.5}Co_{0.5}Mn_{2.0}O_4$, $Cu_{0.7}Co_{0.3}Mn_{2.0}O_4$, and $Cu_{0.2}Co_{0.4}Mn_{2.4}O_4$. As may be seen in FIG. 1B, sweep test results, shows that bulk powder catalyst samples of $Cu_{0.7}Co_{0.3}Mn_{2.0}O_4$ spinel on $Pr_6O_{11}$—$ZrO_2$ support oxide exhibit improved level of activities in NOx conversion, as shown at R-value=1.2, NOx conversion is about 93.2%. When Mn is in spinel B site may substantially improve NOx, CO, and HC conversion activities. Also, partial substitution of spinel A site with Cu or Co improves NOx conversion performance. May be noticed that increasing Co content may reduce NOx conversion activity, and the lower NOx conversion happens at $Cu_{1.0}Co_{1.0}Mn_{1.0}O_4$.

Figure 2:
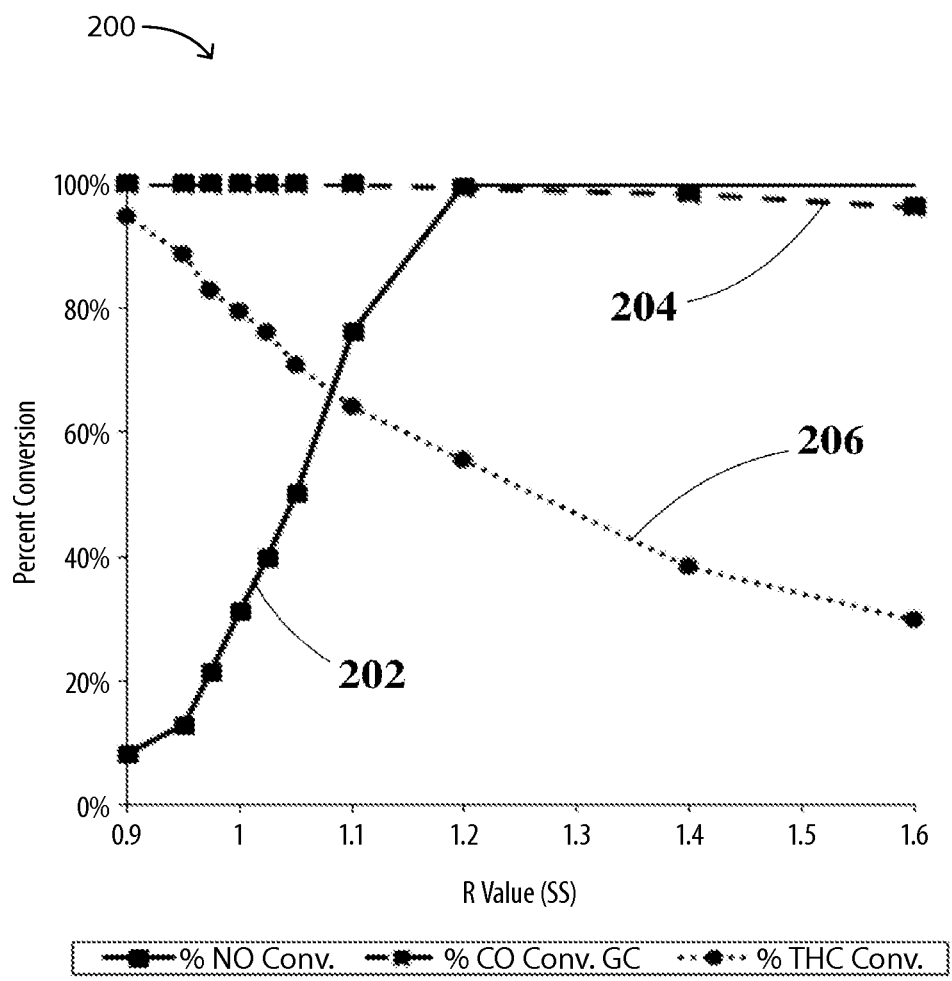
FIG. 2 depicts catalyst conversion performance of bulk powder samples of $(Cu_{0.8}Co_{0.2})Mn_2O_4$ spinel on doped Zirconia support oxide, calcined at about 600° C. for about 5 hours, under isothermal steady state sweep condition at inlet temperature of about 450° C. and space velocity (SV) of about 40,000 $h^{-1}$, according to an embodiment.

Performance of Cu—Co—Mn Spinels on Nb2O5-ZrO2 Prepared by Co-Precipitation Method FIG. 2 illustrates catalyst performance 200 for bulk powder catalyst sample $(Cu_{0.8}Co_{0.2})Mn_2O_4$ on $Nb_2O_5$—$ZrO_2$ support oxide, calcined at about 600° C. for about 5 hours, prepared per example #2 via co-precipitation method, tested under isothermal steady state sweep condition, at inlet temperature of about 450° C. and SV of about 40,000 $h^{-1}$, according to an embodiment.

In FIG. 2, conversion curve 202 (solid line with square), conversion curve 204 (dash line with square), and conversion curve 206 (dotted line with solid circle) respectively illustrate isothermal steady state sweep test results for NO conversion, CO conversion, and HC conversion for bulk powder catalyst samples.

As may be seen in FIG. 2, for bulk powder catalyst samples including non-stoichiometric $(Cu_{0.8}Co_{0.2})Mn_2O_4$ spinel, NO/CO cross over R-value takes place at the specific R-value of 1.2, where $NO_x$ and CO conversions are about 99.4%. Also, may be observed the catalytic activity for bulk powder catalyst samples including non-stoichiometric $(Cu_{0.8}Co_{0.2})Mn_2O_4$ spinel at R-value of 1.1 under close to stoichiometric condition, the NOx conversion is about 76.5%, and CO conversion is about 100%, showing improvement of catalyst level of activities for samples prepared by co-precipitation method compare to IW method. It may be also noted that higher $NO_x$ conversion may be due to the presence of Cu in the spinel structure particularly in A-site with partial substitution with Co.

Figure 3:
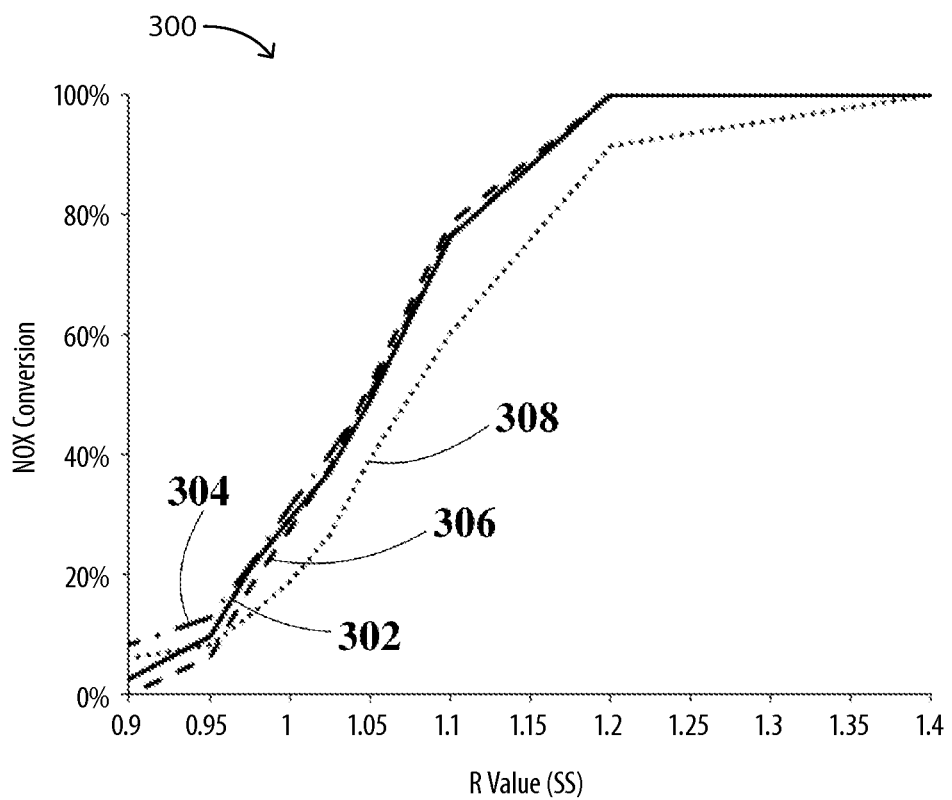
FIG. 3 shows comparison of NOx conversion, employing bulk powder catalyst samples of Example #2, calcined at about 600° C. for about 5 hours under isothermal steady state sweep condition at inlet temperature of about 450° C. and space velocity (SV) of about 40,000 $h^{-1}$, according to an embodiment.

FIG. 3 NOx conversion comparison 300, for bulk powder catalyst samples per example #2 prepared by co-precipitation method, with molar ratios as shown in Table 2, calcined at about 600° C. for about 5 hours, tested under isothermal steady state sweep condition, at inlet temperature of about 450° C. and SV of about 40,000 $h^{-1}$, according to an embodiment.

In FIG. 3 can be seen the identification of curves, as conversion curve 302 (solid line), conversion curve 304 (dot and dash line), conversion curve 306 (dash line), and conversion curve 308 (dot line) respectively, showing steady state sweep test results for NO conversion comparison for bulk powder catalyst samples including $(Cu_{0.9}Co_{0.1})Mn_2O_4$, $(Cu_{0.8}Co_{0.2})Mn_2O_4$, $(Cu_{0.7}Co_{0.3})Mn_2O_4$, and $(Cu_{0.2}Co_{0.4})Mn_{2.4}O_4$ spinel. Sweep test results shows a high level of NOx conversion for $(Cu_{1-x}Co_x)Mn_{2.0}O_4$ where $0.1 \leq X \leq 0.3$, as shown with NOx conversion of 78.5% and 100% at R-value=1.1 and R-value=1.2, respectively for $(Cu_{0.9}Co_{0.1})Mn_2O_4$, $(Cu_{0.8}Co_{0.2})Mn_2O_4$, and $(Cu_{0.7}Co_{0.3})Mn_2O_4$. It may noted that when copper concentration decrease, as shown in $(Cu_{0.2}Co_{0.4})Mn_{2.0}O_4$, the NOx conversion decreases.

Effect of Calcination Temperature on NOx Conversion

Figure 4:
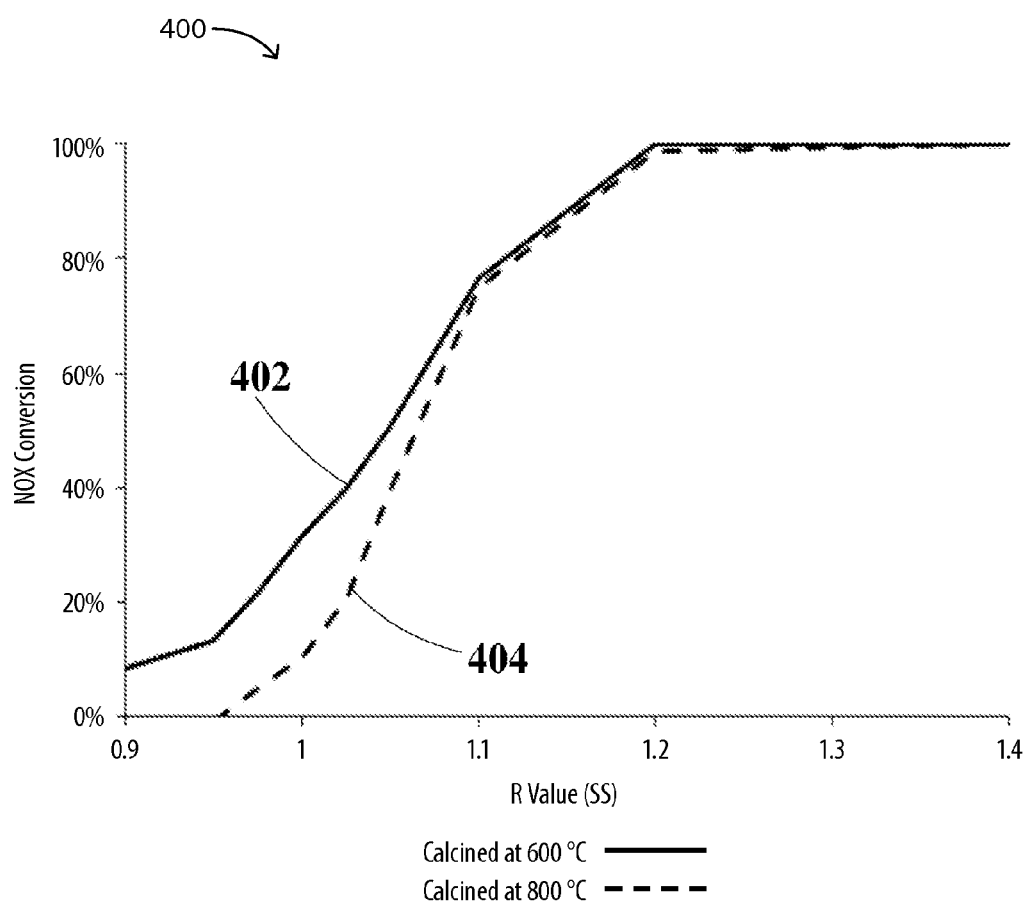
FIG. 4 shows the effect of calcination temperature on NOx conversion of $(Cu_{0.8}Co_{0.2})Mn_2O_4$ spinel on doped Zirconia support oxide calcined at about 600° C., as well as calcined at about 800° C. for about 5 hours respectively, tested under isothermal steady state sweep condition at inlet temperature of about 450° C. and space velocity (SV) of about 40,000 $h^{-1}$, according to an embodiment.

FIG. 4 shows the effect of calcination temperature on NOx conversion performance 400 of bulk powder samples of $(Cu_{0.8}Co_{0.2})Mn_2O_4$ spinel on $Nb_2O_5$—$ZrO_2$ support oxide prepared by co-precipitation method in Example #2. FIG. 4 compares calcination temperature of about 600° C. with calcination temperature of about 800° C., both treatment for about 5 hours, identified respectively as conversion curve 402 (solid line) and conversion curve 404 (dash line). Testing may be performed under isothermal steady state sweep condition, at inlet temperature of about 450° C., and SV of about 40,000 $h^{-1}$, according to an embodiment.

Bulk powder catalyst samples including $(Cu_{0.8}Co_{0.2})Mn_2O_4$ spinel on $Nb_2O_5$—$ZrO_2$ support oxide with calcination at 600 C, shows substantial improvements for NOx conversion at lower R-values, as compared to $(Cu_{0.8}Co_{0.2})Mn_2O_4$ spinel on $Nb_2O_5$—$ZrO_2$ support oxide with calcination at 800 C.

The comparison of effect of calcination temperature on NOx conversion performance for different spinel composition of Table 2 shows $(Cu_{0.8}Co_{0.2})Mn_2O_4$ spinel to be more stable than $(Cu_{0.9}Co_{0.1})Mn_2O_4$ spinel and $(Cu_{0.7}Co_{0.3})Mn_2O_4$ spinel, which may be more degraded after increasing the calcination temperature from about 600° C. to about 800° C.

Also, may be noted in present disclosure that CO and HC conversion is about 100% for all disclosed stoichiometric and non-stoichiometric ternary spinel systems of Cu—Co—Mn for TWC applications.

The improvement of Cu—Co—Mn spinel may be initiated from doping effect of Co to Cu—Mn spinel, which may increase the catalytic activities, providing improved ZPGM bulk powder materials capable to achieve enhanced TWC performance. Also, $(Cu_{0.8}Co_{0.2})Mn_2O_4$ spinel supported on $Nb_2O_5$—$ZrO_2$ support oxide, may have a positive effect and particularly useful for treating exhaust gases produced by internal combustion engines, where lean/rich fluctuations in operating conditions may produce high variation in exhaust contaminants which may be removed, achieving enhanced thermal stability and improved performance under any operating conditions.

The influence that disclosed bulk powder catalyst material including ternary spinel systems of Cu—Co—Mn and doped Zirconia may have on TWC performance may lead to the development of significantly thermally active catalyst materials which may represent a new generation of materials to be made available for ZPGM catalyst systems for utilization in a plurality of environments and TWC applications that may be cost-effectively manufactured.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A catalytic composition, comprising:
   an oxygen storage material, comprising:
   Cu—Co—Mn spinel on a doped zirconia support oxide;
   wherein the oxygen storage material converts at least one of NO, CO and HC through oxidation or reduction; and
   wherein the doped zirconia comprises $Pr_6O_{11}$—$ZrO_2$.

2. A catalytic composition, comprising:
   an oxygen storage material, comprising:
   Cu—Co—Mn spinel on a doped zirconia support oxide;
   wherein the oxygen storage material converts at least one of NO, CO and HC through oxidation or reduction; and
   wherein the doped zirconia comprises $Nb_2O_5$—$ZrO_2$.

3. The composition of claim 1 or 2, wherein the Cu—Co—Mn spinel has the general formula $(Cu_{1-x}Co_x)Mn_{2.0}O_4$ where $0.1 \leq X \leq 0.3$.

4. The composition of claim 1 or 2, wherein the Cu—Co—Mn spinel has the formula $Cu_{0.7}Co_{0.3}Mn_{2.0}O_4$.

5. The composition of claim 1 or 2, wherein the Cu—Co—Mn spinel has the formula $(Cu_{0.8}Co_{0.2})Mn_2O_4$.

6. The composition of claim 1 or 2, wherein the Mn of the Cu—Co—Mn spinel is in the spinel B site.

7. The composition of claim 1 or 2, wherein the oxygen storage material is calcined at about 800° C.

8. The composition of claim 1 or 2, wherein the oxygen storage material is calcined at about 600° C.

9. The composition of claim 1 or 2, wherein the spinel A site of Cu—Co—Mn is selected from Cu or Co.

* * * * *